US011466817B1

(12) United States Patent
Lin et al.

(10) Patent No.: US 11,466,817 B1
(45) Date of Patent: Oct. 11, 2022

(54) LIGHT-EMITTING DEVICE AND LIGHT BULB HAVING THE SAME

(71) Applicants: Hsiao-Cheng Lin, Kaohsiung (TW); Yang-Fang Chen, Taipei (TW)

(72) Inventors: Hsiao-Cheng Lin, Kaohsiung (TW); Yun-Chu Huang, Kaohsiung (TW); Chan-Chan Liu, Kaohsiung (TW); Yi-Jia Lee, Kaohsiung (TW)

(73) Assignees: Hsiao-Cheng Lin, Kaohsiung (TW); Yang-Fang Chen, Taipei (TW)

( * ) Notice: Subject to any disclaimer, the term of this patent is extended or adjusted under 35 U.S.C. 154(b) by 0 days.

(21) Appl. No.: 17/538,065

(22) Filed: Nov. 30, 2021

(51) Int. Cl.
*F21K 9/232* (2016.01)
*F21K 9/238* (2016.01)
*G02B 5/02* (2006.01)
*F21V 23/00* (2015.01)
*F21Y 115/10* (2016.01)

(52) U.S. Cl.
CPC .............. *F21K 9/232* (2016.08); *F21K 9/238* (2016.08); *F21V 23/005* (2013.01); *G02B 5/0278* (2013.01); *F21Y 2115/10* (2016.08)

(58) Field of Classification Search
CPC ........ F21K 9/232; F21K 9/238; F21V 23/005; G02B 5/0278; F21Y 2115/10
See application file for complete search history.

(56) References Cited

U.S. PATENT DOCUMENTS

| 8,704,241 B2 * | 4/2014 | Yeh | .......................... H01L 33/36 257/82 |
| 2007/0131942 A1 * | 6/2007 | Yen | .......................... H05B 45/40 257/79 |
| 2010/0148694 A1 * | 6/2010 | Chang | .................... H05B 45/37 315/294 |

FOREIGN PATENT DOCUMENTS

| CN | 201575346 U | 9/2010 |
| CN | 102468413 A | 5/2012 |
| CN | 209165070 U | 7/2019 |
| TW | M364278 U1 | 9/2009 |

OTHER PUBLICATIONS

Semple et al. "Flexible diodes for radio frequency (RF) electronics: a materials perspective", Oct. 30, 2017, Semiconductor Science and Technology, IOP Publishing Ltd.

* cited by examiner

*Primary Examiner* — Evan P Dzierzynski
(74) *Attorney, Agent, or Firm* — WPAT, PC

(57) ABSTRACT

A light-emitting device and a light bulb having the light-emitting device are disclosed. The light-emitting device includes a power supply unit having a first electrode and a second electrode and outputting a current signal, an impedance unit having a first end and a second end; a first light-emitting module forwardly coupled to the first electrode and reversely coupled to the first end; a second light-emitting module forwardly coupled to the second electrode and reversely coupled to the first end; a third light-emitting module reversely coupled to the first electrode and forwardly coupled to the second end; and a fourth light-emitting module reversely coupled to the second electrode and forwardly coupled to the second end.

10 Claims, 5 Drawing Sheets

LIGHT-EMITTING DEVICE AND LIGHT BULB HAVING THE SAME

BACKGROUND OF THE INVENTION

1. Field of the Invention

The present invention relates to an electrical appliance and, more particularly, to a light-emitting device that does not require an AC/DC transformer and a light bulb having the light-emitting device.

2. Description of the Related Art

Please refer to FIG. 1, which shows a conventional light bulb 9. The conventional light bulb 9 has a light-emitting portion 91 and a base 92. The light-emitting portion 91 is mounted on the base 92, and the light-emitting portion 91 has a globe 911 and a light-emitting unit 912. The globe 911 is connected to the base 92 and covers the light-emitting unit 912, and the light generated by the light-emitting unit 912 can penetrate the globe 911 during operation.

The light-emitting unit 912 adopted by the conventional light bulb 9 uses a DC source as an operating power source thereof, but the commercial power is generally an AC source. Therefore, the conventional light bulb 9 needs to be loaded with another AC/DC transformer to convert the AC source to the DC source. When the consumed power of the light-emitting unit 912 and the output power of the AC/DC transformer mismatch, a current stability of the light-emitting unit 912 will reduce and cause the AC/DC transformer to be easily damaged. Moreover, due to the structure of the conventional light bulb 9 that the globe 911 cannot be disassembled from the base 92, the AC/DC transformer cannot be replaced. Once the AC/DC transformer is damaged, even if the light-emitting unit 912 can still be used, the conventional light bulb 9 will be discarded entirely, causing a waste of resources.

In light of this, it is necessary to improve the conventional light bulb.

SUMMARY OF THE INVENTION

In order to solve the above-mentioned problems, it is an objective of the present invention to provide a light-emitting device that does not need to be loaded with an AC/DC transformer and can directly use an AC source as an input source, which can improve the current stability and the service life of the light-emitting device.

It is therefore the objective of the invention to provide a light-emitting device with improved continuity of illumination.

It is another objective of the invention to provide a light-emitting device with improved stability of illumination.

It is yet another objective of the invention to provide a light-emitting device, which can improve the softness of the light source.

It is also an objective of the invention to provide a light bulb having the light-emitting device, which can improve the convenience of disassembly and assembly.

As used herein, the term "a" or "an" for describing the number of the elements and members of the invention is used for convenience, provides the general meaning of the scope of the invention, and should be interpreted to include one or at least one. Furthermore, unless explicitly indicated otherwise, the concept of a single component also includes the case of plural components.

As used herein, the term "coupling", "engagement", "assembly", or similar terms is used to include separation of connected members without destroying the members after connection or inseparable connection of the members after connection. A person having ordinary skill in the art would be able to select according to desired demands in the material or assembly of the members to be connected.

The light-emitting device of the invention includes a power supply unit having a first electrode and a second electrode, with the first electrode and the second electrode alternately outputting a current signal; an impedance unit having a first end and a second end; a first light-emitting module; a second light-emitting module; a third light-emitting module; and a fourth light-emitting module. The first light-emitting module is forwardly coupled to the first electrode and reversely coupled to the first end. The second light-emitting module is forwardly coupled to the second electrode and reversely coupled to the first end. The third light-emitting module is reversely coupled to the first electrode and forwardly coupled to the second end. The fourth light-emitting module is reversely coupled to the second electrode and forwardly coupled to the second end. Each of the light-emitting modules is in an on-state when the current signal forwardly passes therethrough and each of the light-emitting modules is in an off-state when the current signal is in reverse thereto.

The light bulb of the present invention includes a base having a first cord and a first connecting portion; a carrier mounted on the base and including a second connecting portion, with the second connection portion connected to the first connecting portion; a light-emitting device as described above, with the light-emitting device mounted on the carrier; and a diffuser connected to the base.

Accordingly, the light-emitting device of the present invention is capable of emitting light by using AC source through the loops of the plurality of light-emitting modules, without rectifying by the AC/DC transformer. In addition, the light bulb having the light-emitting device does not require a transformer, thereby achieving the effects of saving element costs, convenient disassembly and assembly, and prolonging service life.

In an example, the impedance unit is a resistor. Thus, when the current passes through the impedance unit, a voltage division can be made to reduce the voltage used for the light-emitting module, achieving the effect of protecting the light-emitting module.

In an example, the impedance unit is a photoconductive resistor. Thus, when the direction of the current signal is changed, its voltage and current can be maintained continuously, improving the continuity of light.

In an example, the impedance unit is a persistent photoconductivity material. Thus, flickering caused by the current signal can be minimised, further improving the illumination stability.

In an example, each of the first light-emitting module, the second light-emitting module, the third light-emitting module and the fourth light-emitting module is an integration of light-emitting diodes. Thus, the brightness, heat dissipation efficiency and power can be adjusted, enhancing illumination efficiency and brightness.

In an example, the integration of light-emitting diodes is composed of a plurality of light-emitting diodes or organic light-emitting diodes connected in parallel or in series. Thus, the glare and light pollution generated by the light-emitting module can be reduced, achieving the effect of improving the softness of the light source.

In an example, the carrier includes a second cord coupled to the first cord of the base. Thus, the carrier and the base are detachably coupled, achieving the effect of convenient disassembly and assembly.

In an example, the base includes a heat sink located inside the base. Thus, the heat accumulation of the light-emitting device can be reduced, achieving the effect of retaining constant temperature.

In an example, the base includes a positive terminal and a negative terminal, with the positive terminal and the negative terminal coupled to the first cord and an external AC source. Thus, the light bulb can be fixed in a traditional socket.

BRIEF DESCRIPTION OF THE DRAWINGS

The invention will become clearer in light of the following detailed description of illustrative embodiments of this invention described in connection with the drawings.

DETAILED DESCRIPTION OF THE INVENTION

Figure 1:
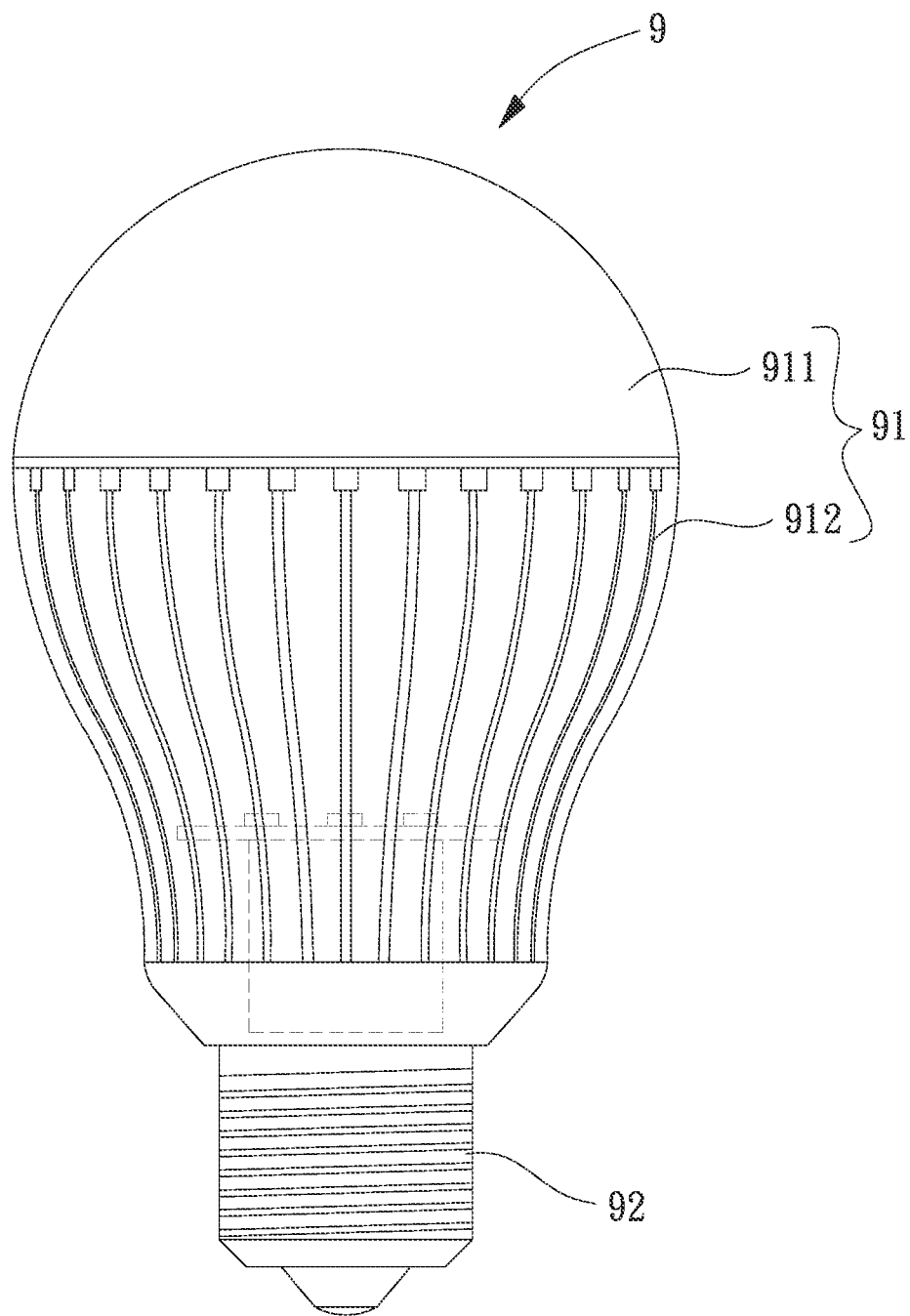
FIG. 1 is a schematic diagram of a conventional light bulb.
Figure 2:
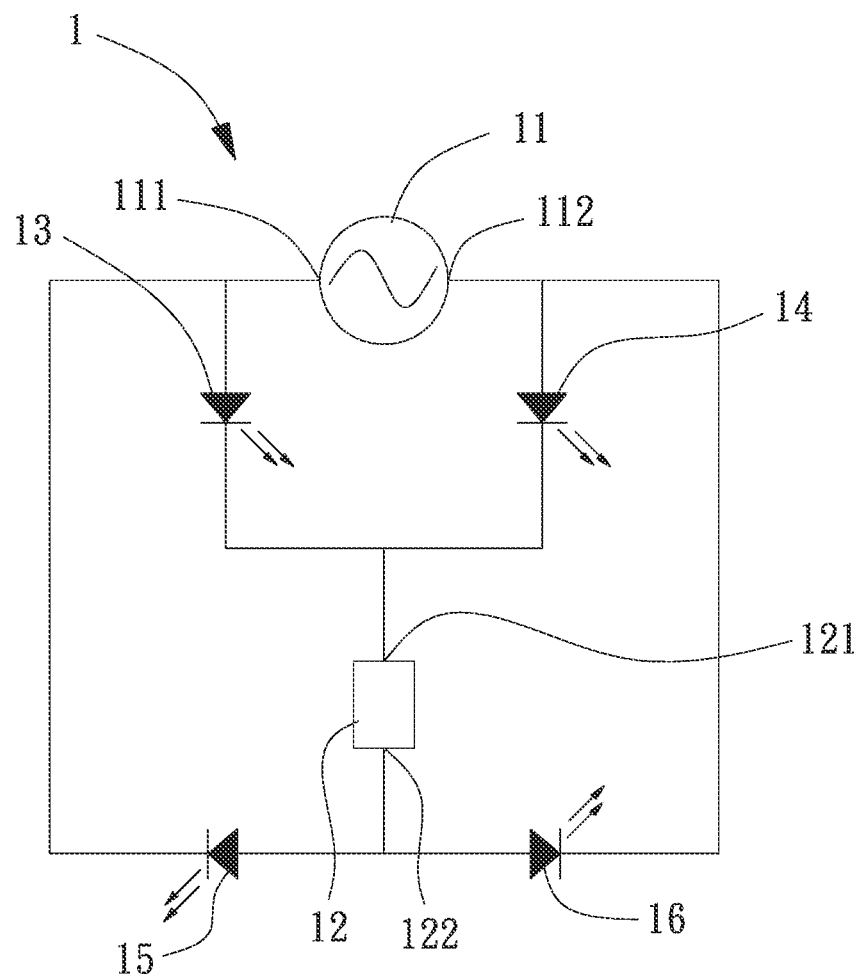
FIG. 2 is a circuit diagram of a preferred embodiment of the present invention.

Please refer to FIG. 2, which shows a preferred embodiment of the light-emitting device 1 of the present invention. The light-emitting device 1 includes a power supply unit 11, an impedance unit 12, a first light-emitting module 13, a second light-emitting module 14, a third light-emitting module 15 and a fourth light-emitting module 16. The first light-emitting module 13, the second light-emitting module 14, the third light emitting module 15 and the fourth light emitting module 16 are respectively coupled to the power supply unit 11 and the impedance unit 12.

The power supply unit 11 has a first electrode 111 and a second electrode 112. The first electrode 111 and the second electrode 112 alternately output a current signal so that the flow direction of the current signal in the light-emitting device 1 changes between forward and backward with time. The power supply unit 11 can be electrically connected to an AC source, so that an AC current is output through the first electrode 111 and the second electrode 112 to form the current signal.

The impedance unit 12 has a first end 121 and a second end 122. The impedance unit 12 can be a resistor, so that the impedance between the first end 121 and the second end 122 makes a voltage division on the loop of the light-emitting device 1, thus the magnitude of the current signal can be adjusted and the luminous state can be stabilized. The impedance unit 12 can also be a photoconductive resistance, which makes the resistance of the impedance unit 12 reduce when illuminated. When the current signal changes direction and reduces the current value, the impedance unit 12 stabilizes the luminous state by reducing the impedance. The impedance unit 12 can also be a persistent photoconductivity material, such as an amorphous indium gallium zinc oxide (a-IGZO), so that the impedance unit 12 generates a photocurrent when illuminated. When the current signal decreases, the impedance unit 12 provides the photocurrent to supplement the current value to stabilize the luminous state.

The first light-emitting module 13 is forwardly coupled to the first electrode 111 and reversely coupled to the first end 121, the second light-emitting module 14 is forwardly coupled to the second electrode 112 and reversely coupled to the first end 121, the third light-emitting module 15 is reversely coupled to the first electrode 111 and forwardly coupled to the second end 122, and the fourth light-emitting module 16 is reversely coupled to the second electrode 112 and forwardly coupled to the second end 122. The first electrode 111 and the second electrode 112 can alternately output the current signal to the first light-emitting module 13, the second light-emitting module 14, the third light-emitting module 15 and the fourth light-emitting module 16. When the current signal forwardly passes through each of the above-mentioned light-emitting modules 13, 14, 15 and 16, each of them is in an on-state, and when the current signal is in reverse to each of the above-mentioned light-emitting modules 13, 14, 15 and 16, each of them is in an off-state.

The first light-emitting module 13, the second light-emitting module 14, the third light-emitting module 15 and the fourth light-emitting module 16 can be an integration of light-emitting diodes. Among them, the integration of light-emitting diodes can be composed of a plurality of light-emitting diodes or organic light-emitting diodes connected in parallel or in series, with the number of light-emitting diodes or organic light-emitting diodes adjusted according to the required brightness, heat dissipation efficiency and power. The present invention is not limited in this regard. In addition, the organic light-emitting diodes can reduce glare and light pollution, which can achieve the effect of improving the softness of the light source.

More specifically, when the light-emitting device 1 outputs the current signal through the first electrode 111 of the power supply unit 11, the first light-emitting module 13 and the fourth light-emitting module 16 are in the on-state, and the second light-emitting module 14 and the third light-emitting module 15 are in the off-state, so that the power supply unit 11, the first light-emitting module 13, the impedance unit 12 and the fourth light-emitting module 16 form a closed loop. Furthermore, when the light-emitting device 1 outputs the current signal through the second electrode 112 of the power supply unit 11, the second light-emitting module 14 and the third light-emitting module 15 are in the on-state, and the first light-emitting module 13 and the fourth light-emitting module 16 are in the off-state, so that the power supply unit 11, the second light-emitting module 14, the impedance unit 12 and the third light-emitting module 15 form another closed loop. Then, when the current signal repeatedly changes the flow direction in a fixed period, the two closed loops will be switched on in turns and emit light. Since the frequency of the general commercial power is 60 Hz and the power supply unit 11 is electrically connected to the commercial power, each of the closed loops is switched on and off at a rate of 60 times per second. As a result, each of the light-emitting modules 13, 14, 15 and 16 of the light-emitting device 1 flicker and emit light, achieving the effect of directly applying alternating current to daily light sources.

Figure 3:
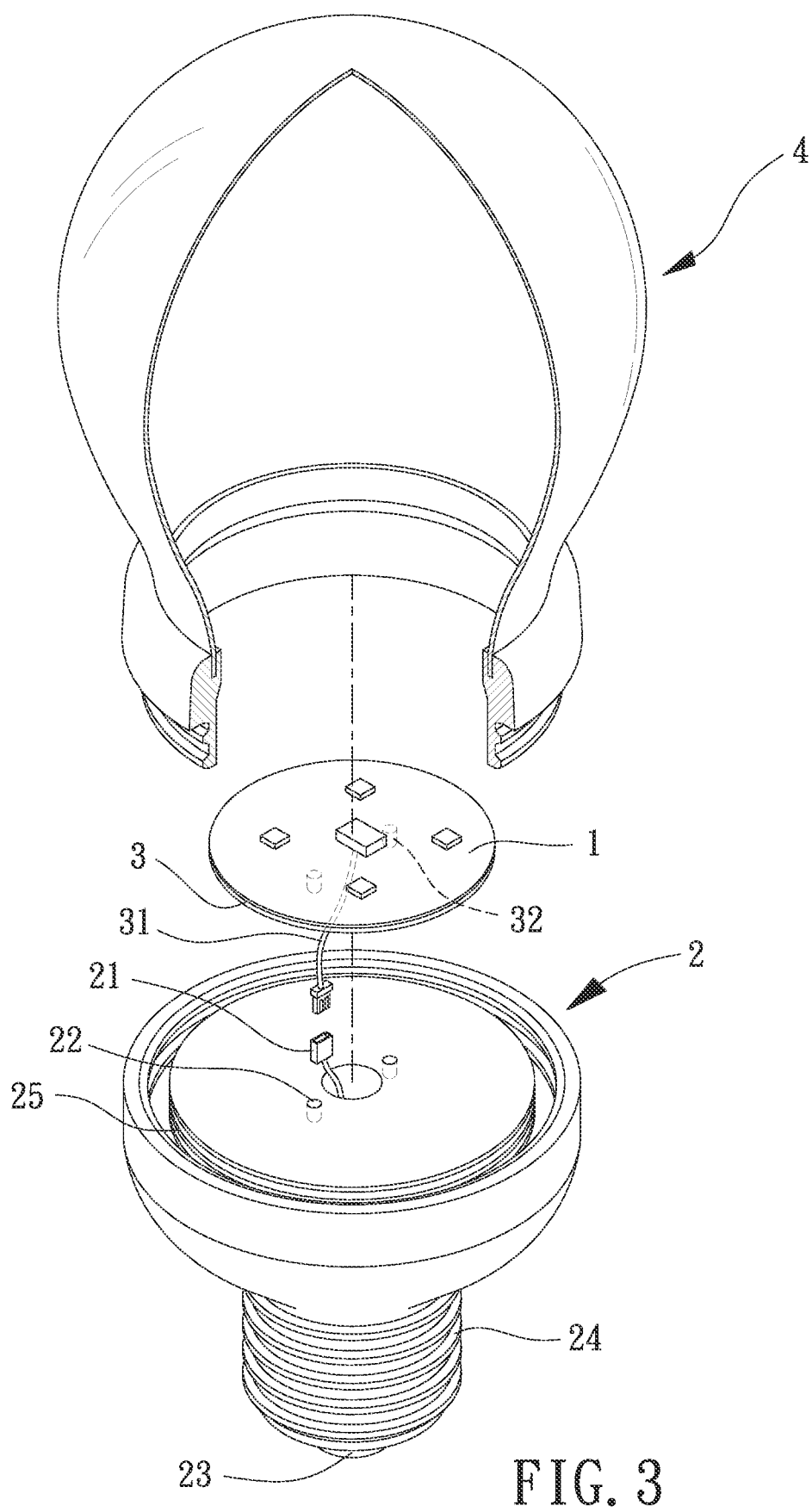
FIG. 3 is an exploded, perspective view of a preferred embodiment of the present invention.

Please refer to FIG. 3, which shows a preferred embodiment of the light bulb of the present invention including a light-emitting device 1 as described above, a base 2, a carrier 3 and a diffuser 4. The light-emitting device 1 is mounted on the carrier 3, the carrier 3 is mounted on the base 2, and the diffuser 4 is connected to the base 2 and encloses the light-emitting device 1 and the carrier 3.

The base 2 is coupled to an external AC source and can be mounted in an external socket. The base 2 has a first cord 21 which is coupled to the power supply unit 11 and the carrier 3. The base 2 further has a first connecting portion 22 for connecting the carrier 3. The base 2 may have a positive terminal 23 and a negative terminal 24, the positive terminal 23 and the negative terminal 24 are coupled to the first cord 21 and the external AC source. In a preferred embodiment, the positive terminal 23 is located at the tip below the negative terminal 24. The negative terminal 24 is located on an outer surface of a column above the positive terminal 23, and the negative terminal 24 can be threaded and detachably connected to the external socket. Therefore, the positive terminal 23 and the negative terminal 24 achieve the effect of fixing and conducting the light bulb. The base 2 can have a heat sink 25 located inside the base 2, and the heat sink 25 can be disposed under the first connecting portion 22. The material of the heat sink 25 can be an effective heat-conducting metal, which achieves the effect of improving heat dissipation efficiency.

The carrier 3 is connected to the light-emitting device 1 and the base 2, and has a second cord 31 which can be coupled to the power supply unit 11 and the first cord 21. The carrier 3 further has a second connecting portion 32, which can be detachably coupled with the first connecting portion 22. In this embodiment, the first connecting portion 22 and the second connecting portion 32 are a slot and post structure, and the first connecting portion 22 and the second connecting portion 32 can be coupled by any known coupling structure, and the present invention is not limited in this regard. In a preferred embodiment, by separating the first cord 21 and the second cord 31, and separating the first connecting portion 22 and the second connecting portion 32, the base 2 and the carrier 3 can be separated.

Figure 4:
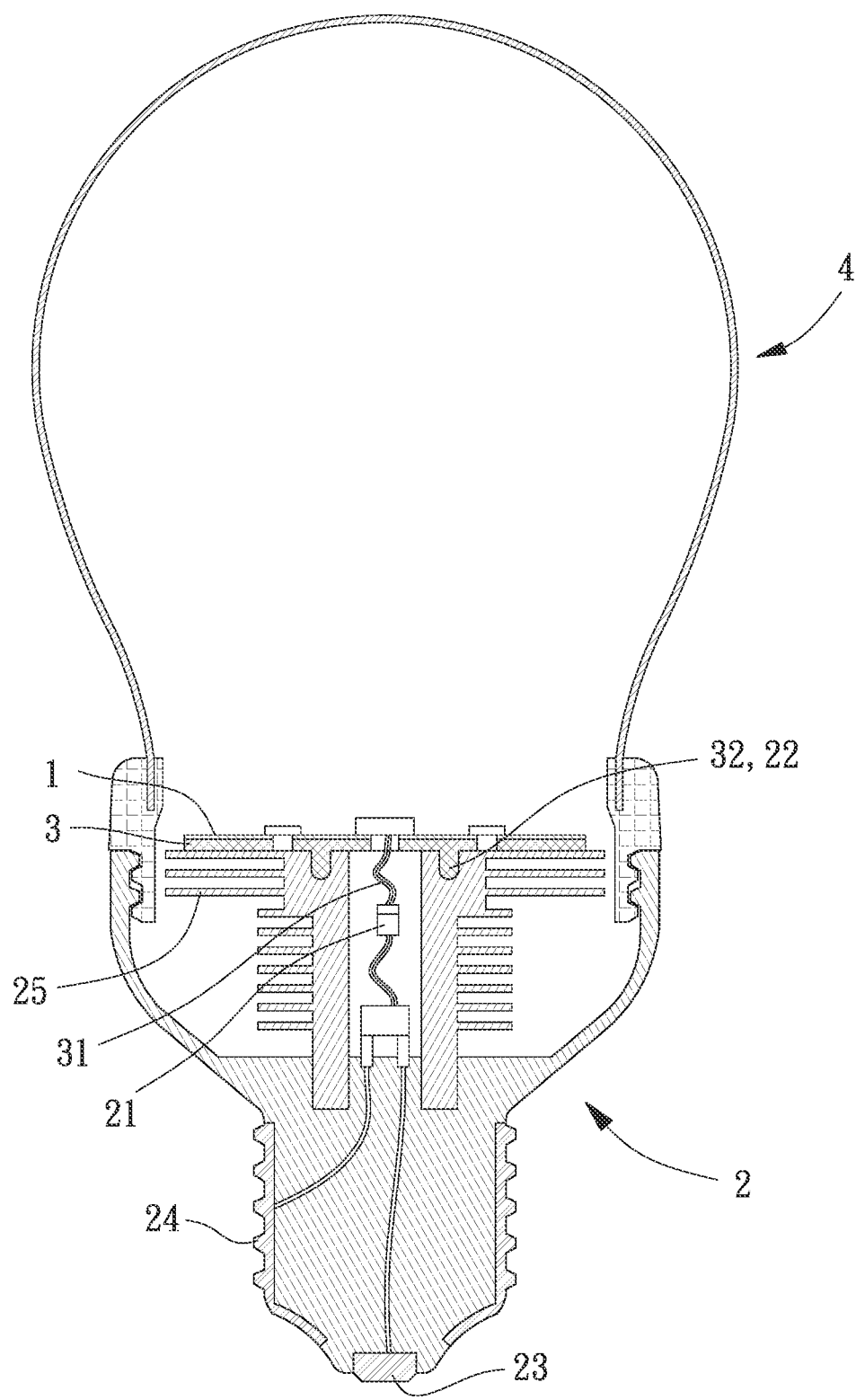
FIG. 4 is a cross-sectional view of a preferred embodiment of the present invention after assembly.
Figure 5:
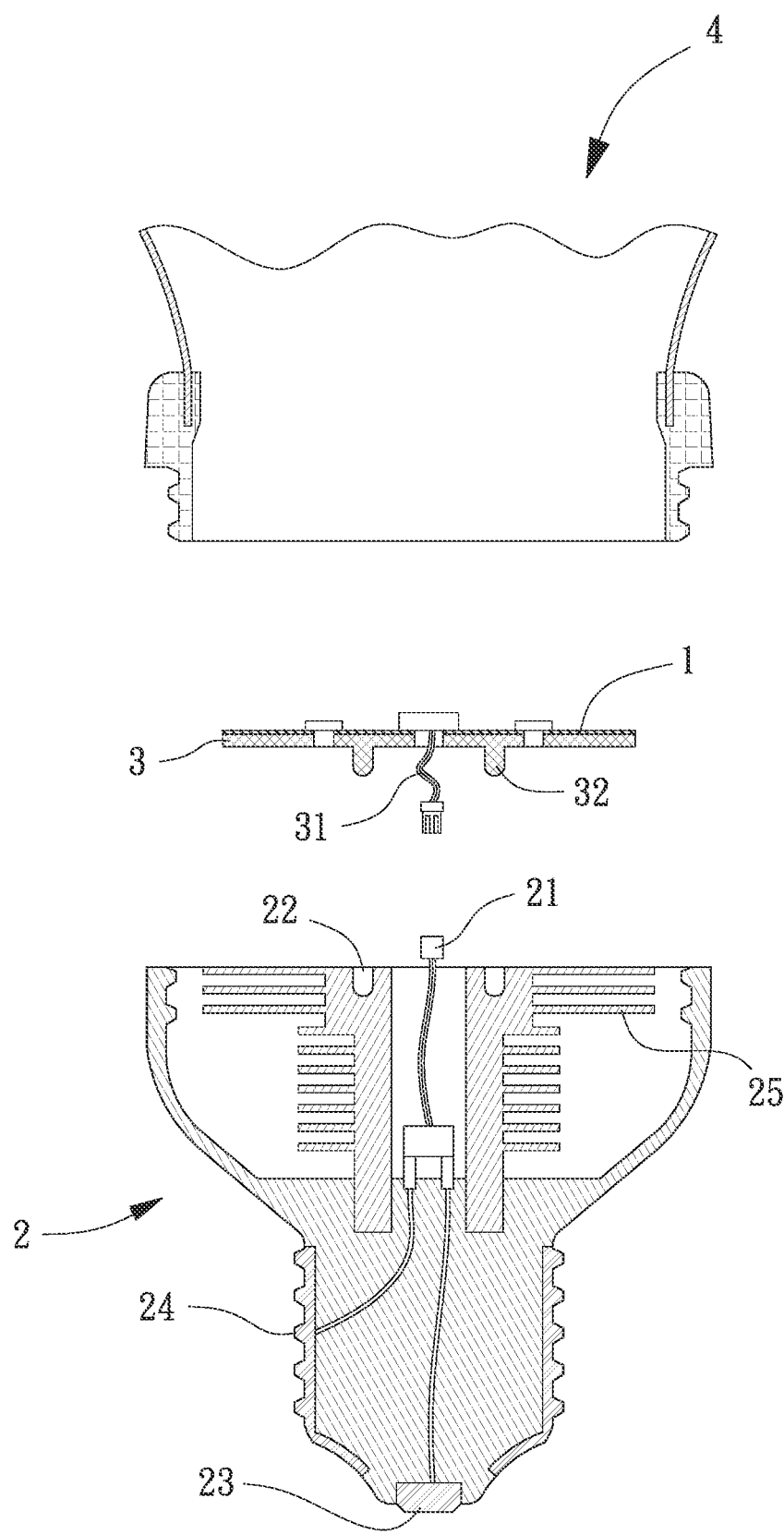
FIG. 5 is a partial exploded view of FIG. 4.

Please refer to FIGS. 4 and 5. The diffuser 4 is connected to the base 2, so that the light generated by the operation of the first light-emitting module 13 and the second light-emitting module 14 can penetrate through the diffuser 4, which achieves the effect of improving the concentration of the light source.

More specifically, in the light bulb of the preferred embodiment, the base 2 and the carrier 3 can be separated by separating the first cord 21 and the second cord 31, and separating the first connecting portion 22 and the second connecting portion 32. Once the light-emitting device 1 is out of service, the carrier 3 can be replaced by the aforementioned steps, thereby having the convenience of disassembly and assembly.

In summary, the light-emitting device of the present invention can emit light by using AC source through the loops of the plurality of light-emitting modules, without conversion by the AC/DC transformer. Furthermore, the impedance unit can reduce flickering caused by AC source, thus improving the illumination stability. In addition, the light bulb having the light-emitting device does not require a transformer, thereby achieving the effects of saving costs, convenient disassembly and assembly of components, and prolonged service life.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A light-emitting device, comprising:
   a power supply unit having a first electrode and a second electrode, with the first electrode and the second electrode alternately outputting a current signal;
   an impedance unit having a first end and a second end;
   a first light-emitting module forwardly coupled to the first electrode and reversely coupled to the first end;
   a second light-emitting module forwardly coupled to the second electrode and reversely coupled to the first end;
   a third light-emitting module reversely coupled to the first electrode and forwardly coupled to the second end; and
   a fourth light-emitting module reversely coupled to the second electrode and forwardly coupled to the second end;
   wherein each of the light-emitting modules is in an on-state when the current signal forwardly passes therethrough and each of the light-emitting modules is in an off-state when the current signal is in reverse thereto.

2. The light-emitting device as claimed in claim 1, wherein the impedance unit is a resistor.

3. The light-emitting device as claimed in claim 1, wherein the impedance unit is a photoconductive resistor.

4. The light-emitting device as claimed in claim 1, wherein the impedance unit is a persistent photoconductivity material.

5. The light-emitting device as claimed in claim 1, wherein each of the first light-emitting module, the second light-emitting module, the third light-emitting module and the fourth light-emitting module is an integration of light-emitting diodes.

6. The light-emitting device as claimed in claim 5, wherein the integration of light-emitting diodes is composed of a plurality of light-emitting diodes or organic light-emitting diodes connected in parallel or in series.

7. A light bulb, comprising:
   a base having a first cord and a first connecting portion;
   a carrier mounted on the base and including a second connecting portion, with the second connecting portion connected to the first connecting portion;
   a light-emitting device as claimed in claim 1, with the light-emitting device mounted on the carrier; and
   a diffuser connected to the base.

8. The light bulb as claimed in claim 7, wherein the carrier includes a second cord coupled to the first cord of the base.

9. The light bulb as claimed in claim 7, wherein the base includes a heat sink located inside the base.

10. The light bulb as claimed in claim 7, wherein the base includes a positive terminal and a negative terminal, with the positive terminal and the negative terminal coupled to the first cord and an external AC source.

* * * * *